UNITED STATES PATENT OFFICE.

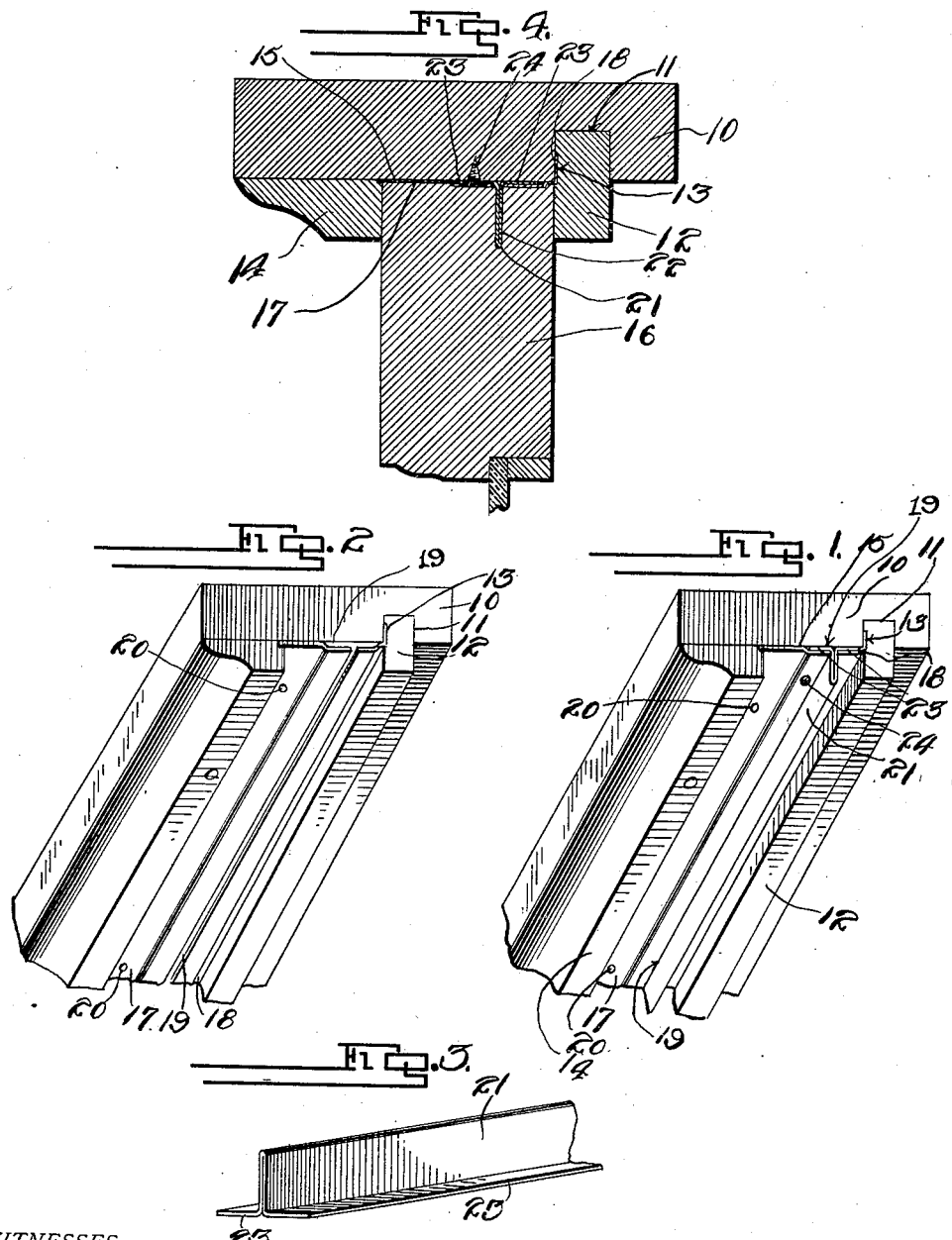

FRANK A. WENTZ AND ALLEN L. CURTIS, OF SWANTON, OHIO.

METAL WEATHER-STRIP.

1,065,569.  Specification of Letters Patent.  Patented June 24, 1913.

Application filed December 30, 1911. Serial No. 668,656.

*To all whom it may concern:*

Be it known that we, FRANK A. WENTZ and ALLEN L. CURTIS, citizens of the United States, residing at Swanton, in the county of Fulton and State of Ohio, have invented certain new and useful Improvements in Metal Weather-Strips, of which the following is a specification, reference being had therein to the accompanying drawing.

This invention relates to weather strips which are secured to the window frame so that the window will be prevented from rattling.

This weather strip is so constructed that the portion of the strip which holds the window in position may be removed very readily so that the window may be removed from the frame when desired, as easily as a window which is not provided with the weather strip.

This invention is illustrated in the accompanying drawings, wherein:

Figure 1 is a perspective view of the window frame with the weather strip in place. Fig. 2 is a perspective view of the window frame with the window engaging strip removed. Fig. 3 is a perspective view of the window engaging strip. Fig. 4 is a transverse sectional view through the window frame and window.

Referring to the accompanying drawings, by numerals it will be seen that the window frame 10 is provided with the groove 11 in which the parting bead 12 is mounted, the parting bead 12 being provided with a groove 13. The parting bead 12 is securely fastened in the groove 11, and together with the removable inner stop 14 forms a track 15 in which the window 16 travels.

Metallic strips 17 and 18 are positioned in the track and are spaced from the track 15 to form the pockets 19. The strip 17 fits beneath the inner stop 14 and is secured in place by the inner stop 14, and the nails 20. The strip 18 has one side portion bent at right angles and fit into the groove 13 so that the strip 18 will be securely held in place.

The window engaging strip is bent longitudinally to form the tongue 21 which fits into the groove 22 formed in the windows 16. This tongue 21 holds the window so that it cannot rattle. The strip from which the tongue is formed has its sides bent apart to form the flanges 23 which fit into the pockets 19 with the tongue extending between the strips 17 and 18. The tongue is held in position by a screw 24 which passes into the window frame thus removably securing the tongue in position. It is, of course, advisable, that any desired number of screws may be used. It should be noted that the weather strip is so constructed that the tongue 21 is positioned to one side of the vertical center of the window frame as clearly shown in the drawings.

When using this device, the strips 17 and 18 are secured to a window frame as shown, and the tongue 21 has its flanges 23 slipped into the pockets 19 so that the tongue will be positioned as shown in Fig. 1. The window is mounted in the frame with the tongue fitting into the groove 22 and the window will then be prevented from rattling. When it is desired to remove the window the screw or screws are removed and the tongue can then be very easily slipped out of the pockets 19 so that the window may be removed as easily as a window which is not provided with this weather strip.

What is claimed is:—

A window attachment of the character described comprising a pair of attaching sections adapted to be secured to the frame of a window, one of said sections having its outer edge portion positioned beneath the inner stop of a window frame and the remaining section being bent longitudinally to form a flange positioned in the groove receiving the parting bead of a window frame, the free edge portions of said attaching strips being positioned in spaced relation to each other and in spaced relation to the window frame to form a pocket, and a strip bent longitudinally to form a tongue adapted to pass through a groove formed in a window sash and having its edge portions bent apart to form flanges fitting within the pocket beneath said attaching strips, said tongue extending through the space between the edges of said attaching strips, and means for removably attaching said strip to the frame.

In testimony whereof we hereunto affix our signatures in presence of two witnesses.

FRANK A. WENTZ.
ALLEN L. CURTIS.

Witnesses:
HENRY H. HUNN,
W. F. HUNN.

Copies of this patent may be obtained for five cents each, by addressing the "Commissioner of Patents. Washington, D. C."